United States Patent [19]

Griffiths

[11] 4,085,201

[45] Apr. 18, 1978

[54] PROCESS FOR MANUFACTURING ALUMINUM OXIDE

[76] Inventor: Kenneth F. Griffiths, 21 N. Chatsworth Ave., Larchmont, N.Y. 10538

[21] Appl. No.: 700,116

[22] Filed: Jun. 28, 1976

Related U.S. Application Data

[63] Continuation of Ser. No. 441,129, Feb. 11, 1974, abandoned.

[51] Int. Cl.$^2$ ................................................ C01F 7/32
[52] U.S. Cl. .................................. 423/625; 220/2.1 R
[58] Field of Search ........................ 423/132, 625, 628

[56] References Cited

U.S. PATENT DOCUMENTS

| 2,773,741 | 12/1956 | Antonsen | 423/625 |
| 2,801,901 | 8/1957 | Dingman et al. | 423/625 |
| 2,828,186 | 3/1958 | Dingman et al. | 423/625 |
| 3,275,405 | 9/1966 | Clark | 423/625 |
| 3,672,831 | 6/1972 | Dueker et al. | 423/628 |

*Primary Examiner*—Herbert T. Carter

[57] ABSTRACT

There is disclosed a two step process for manufacturing aluminum oxide of controlled particle size from aluminum sulfate by the thermal decomposition of aluminum sulfate into aluminum oxide and other gaseous by-products at a relatively low temperature, and the treatment of the aluminum oxide product of the first step at a controlled higher temperature for the purpose of increasing the average particle size by a desired amount.

8 Claims, No Drawings

PROCESS FOR MANUFACTURING ALUMINUM OXIDE

This is a continuation application of Ser. No. 441,129, filed Feb. 11, 1974, now abandoned.

The present invention relates to the production of aluminum oxide powder by the thermal decomposition of aluminum sulphate. More specifically, the invention relates to a two step improved method of producing aluminum oxide powder of controlled particle size by the thermal decomposition of aluminum sulphate at a relatively low temperature (red heat); and, second, the curing of the uncured aluminum oxide at a higher (yellow heat) controlled temperature for a definite length of time.

As employed herein the term "curing" means a thermal treatment process in which the average particle size of the aluminum oxide powder increases under the influence of high temperature (usually temperatures of between 1150° C and 1350° C.).

As used herein, the term "aluminum sulphate" also includes ammonium aluminum sulphate, and, basic aluminum sulphate. Therefore, the invention may also be used in the preparation of aluminum oxide from ammonium aluminum sulphate, aluminum sulphate and/or basic aluminum sulphate.

The manufacture of high density ultra-pure aluminum oxide ceramics and polycrystalline sodium vapor lamp envelopes requires aluminum oxide powder of relatively uniform and controlled particle size and it is therefore highly desirable to avoid a mixture which consists of relatively large particles and extremely fine powder.

It is well known in the art of producing aluminum oxide powder that the average particle size can be increased by curing the aluminum oxide powder at a higher temperature and also by increasing the duration of the curing cycle.

One convenient method of measuring the effective average particle size is by the determination of the surface area of the powder in square meters per gram. The greater the surface area per gram of powder, the smaller the average particle size.

Manufacturers of high density polycrystalline aluminum oxide ceramic bodies and sodium vapor lamp envelopes have found that aluminum oxide powder produced from calcined aluminum sulfate and cured at a temperature (circa 1200° C) sufficient to decrease the surface area of the aluminum oxide to approximately 12 to 14 square meters per gram is highly suitable for their applications.

Pure aluminum sulfate, however, starts to decompose into aluminum oxide and gaseous by-products at approximately 800° C at atmospheric pressure. Aluminum oxide powder having this high a surface area is, however, unsuitable for the production of sodium vapor lamps.

The commonly employed method of producing aluminum oxide powder having a surface area between 12 and 14 square meters per gram is to calcine (thermally decompose) aluminum sulfate in a furnace having a temperature in the range of 1200° C to 1250° C. In such cases, however, the aluminum oxide product near the heated walls of the calcining muffle or crucible tends to overheat i.e. become overcured and the aluminum oxide near the center tends to be underheated, i.e. be undercured. Therefore, the particle size of the aluminum oxide near the heated walls is too large and too small near the center of the aluminum oxide charge.

In most commonly employed calcining furnaces and muffles, an undesirable and substantial thermal gradient condition in the aluminum oxide product mass is aggravated by the extremely large amount of heat absorbed by the decomposition of the aluminum sulfate into aluminum oxide and gaseous by-products.

It is accordingly an object of the invention to produce aluminum oxide powder having as uniform a particle size as possible.

It is a further object of the invention to provide a method which allows more uniform temperature conditions to prevail in a mass of aluminum oxide powder being cured at high temperature.

Another object of the invention is to facilitate the process of curing ultra-fine aluminum oxide powder to the desired average particle size.

A still further object of the invention is to avoid one or more drawbacks of the prior art.

These and other objects and advantages of the invention will become more apparent from the following detailed disclosure and claims.

Broadly speaking, the invention includes the provision of a method of producing aluminum oxide powder of controlled particle size from aluminum sulfate comprising (1) thermally decomposing said aluminum sulfate into aluminum oxide and (2) thereafter treating said aluminum oxide at a controlled temperature higher than the temperature employed in step (1) whereby the average particle size of aluminum oxide is increased.

As is readily apparent therefrom, the invention contemplates conducting the thermal decomposition of the aluminum sulphate in a substantially separate step from the process of curing the aluminum oxide product of the thermal decomposition step.

The present invention may if desired, be operated in a batch type of muffle furnace which has been provided with means for controlling the temperature of the muffle walls. In conducting a run, the muffle is filled with a predetermined charge of aluminum sulphate; the muffle is then heated to a temperature above the decomposition temperature of the latter (approximately about 800° to about 1150° C, preferably about 1100° to 1150° C), optimally about 1100° C. but below the minimum effective curing temperature (approximately 1150° to 1250° C, preferably about 1175° to 1225° C, optimally about 1200° C) of the aluminum oxide product. By "minimum effective curing temperature" there is meant the lowest temperature at which proper curing could take place within a reasonable length of time. The muffle should be preferably maintained within the aforementioned temperature range until all of the aluminum sulphate has decomposed and the mass of remaining aluminum oxide product has achieved a relatively uniform temperature. The temperature of the muffle may then be increased rapidly relative to the heat up temperature to the curing temperature of about 1150° to 1250° C, preferably 1175° to 1225° C, optimally about 1200° C. In this process, the relatively low heat capacity of the aluminum oxide product permits all of it to heat up at approximately the same rate as the muffle. Thus, as soon as the muffle achieves the optimum curing temperature, substantially all of the aluminum oxide mass has also achieved that same temperature. The curing temperature may be maintained thereafter for a suitable duration (i.e., 2 to 20 hours, or about four hours) and then the muffle and its contents are allowed to cool relatively rapidly (i.e., ½ to 2 hours) to a temperature (1150° C) below which further curing ceases. The time of curing is substantially non-critical and may vary over a wide range, in part, being determined by the temperature employed.

In a preferred form of the invention, the process is carried out in a suitable conventional-type continuous calciner. Such a calciner may be provided with a conduit-type of muffle through which particulate solid material can be continuously passed. On the other hand, it may also be of the conventional rotary-type similar in design to that employed in the production of Portland Cement. Where a continuous calciner is employed it is provided with means for the introduction and withdrawal of solid flowable material into it while it is hot. Usually, solid flowable material will be introduced into one end and withdrawn from the other end at a controlled rate leaving in the calciner, at all times a residue of aluminum oxide produced previously as a starting pile for the freshly added reactants.

In another form of the invention, there may be employed a continuous-type of calciner provided with two distinct temperature zones. Aluminum sulphate may be fed into the calciner at a controlled rate and passed through a thermal decomposition zone maintained at a temperature above the thermal decomposition temperature of aluminum sulphate but below the aforementioned minimum curing temperature. It is preferred that the feed material remain within the thermal decomposition zone for a sufficient period of time to allow all of the aluminum sulphate content thereof to decompose into uncured aluminum oxide powder. The uncured aluminum oxide will then pass into a hotter curing zone provided with temperature control means suitable for maintaining the aluminum oxide passing through it at the desired optimum curing temperature. The length of the curing zone and the speed of the aluminum oxide passing through it may be selected to control the retention time of the aluminum oxide at the curing temperature employed.

A still further form of the invention contemplates employing two distinct calciners. The first of these may be employed for the thermal decomposition of aluminum sulphate into uncured aluminum oxide; the second may be used for the curing of uncured aluminum oxide at a controlled optimum curing temperature. In this the uncured aluminum oxide product of the thermal decomposition calciner may be treated as for instance by, crushing, screening and blending to prepare it as a physically uniform feed material of known bulk density for the curing calciner. This may in some instances be advantageous for facilitating the reliability of operation of the curing calciner because the rate of curing increases dramatically as the bulk density of the aluminum oxide is increased. Therefore, a uniform and known bulk density of the uncured aluminum oxide facilitates the selection of the proper temperature and curing duration of the curing calciner. In addition, the thermal decomposition calciner and the curing calciner may be either continuous or batch-type in operation.

In all embodiments, predetermined metered flows of materials can be fed to the reaction zones by employing means for such purpose known in the art, i.e., weight metering in cooperation with a moving belt, pipe and pump feeds etc.

The following examples are offered by way of illustration only and are not to be considered as limiting the scope of the invention. In the examples as well as the appended claims, all parts, proportions and ratios are by weight unless otherwise indicated.

The Examples illustrate the difference in operation between the conventional process of calcining aluminum sulphate and the process of the instant invention.

EXAMPLE 1

Illustration of a specific embodiment in accordance with the invention:

A muffle chamber of high alumina ceramic is provided which has inside dimensions of 12 inches by 12 inches by 24 inches and a removable lid which allows it to be opened at the top for the purpose of introducing powder into it and removing powder from it. The muffle chamber is able to be placed within an electric heated furnace capable of maintaining the muffle walls at a controlled temperature.

Before the start of the run, the muffle top is removed and the muffle filled with 2 cubic feet of dehydrated aluminum sulfate powder. The top is then replaced on the muffle chamber and the furnace door closed. The furnace is next heated from room temperature to 1050° C over a 10 hour heat up period. The furnace is thereafter maintained at 1050° C for a 20 hour thermal decomposition period. During the first 17 hours of the thermal decomposition period, the aluminum sulfate charge generates a sulfur copious discharge of sulfur dioxide, sulfur trioxide and oxygen gases. Before the conclusion of the thermal decomposition period, all of the aluminum sulfate has thermally decomposed into uncured aluminum oxide. In addition, at the end of the thermal decomposition period, all portions of the aluminum oxide product in the muffle are at a relatively uniform temperature, near 1050° C.

At the conclusion of the 20 hour thermal decomposition period, the heating furnace and muffle are brought up to 1225° C within a 1 hour heat up period. The furnace and muffle are then maintained at 1200° C for a 8 hour curing period. A pyrometer probe placed in the center portion of the muffle charge indicates that the central portion of the aluminum oxide mass heated up from 1050° C to 1200° C almost as fast as the muffle. The central portion of the aluminum oxide mass is also at the curing temperature of 1200° C substantially as long as the portion adjacent to the muffle walls.

It should be noted that the pyrometer probe in the center of the charge within the muffle remains at approximately 810° C during most of the 20 hour thermal decomposition period.

However, a second pyrometer probe in the portion of the charge adjacent to the muffle wall indicates that the temperature increases from 810° C to 1050° C relatively early in the thermal decomposition period. Therefore, the portion of the aluminum oxide near the muffle wall is at 1050° C much longer than the central portion.

It should be noted that at the conclusion of the 20 hour thermal decomposition period, the aluminum oxide adjacent to the muffle walls is as uncured as the oxide in the central portion. This is because 1050° C is an insufficient temperature to cure the aluminum oxide within a practical length of time.

After the furnace has cooled to room temperature over the 4 hour curing period, a sample is taken from the portion of the aluminum oxide product near the muffle wall and a second sample from the central portion. A surface area determination is conducted on both of these samples and shows that the aluminum oxide near the muffle walls is only very slightly more cured than the oxide in the central portion. Therefore, the procedure described in this example results in relatively even curing throughout all of the portions of the mass of aluminum oxide product. This accordingly means the particle size throughout the entire mass of product is substantially uniform.

EXAMPLE 2

Illustration of conventional calcining process:

The same equipment and starting procedure, as employed in Example 1 is utilized in this instance. However, the furnace and the muffle are heated from room temperature to 1250° C over a 12 hour heat up period. Thereafter the furance and muffle are maintained at 1250° C for an additional 15 hour heat soak period.

The temperature of the pyrometer probe in the aluminum sulfate charge next to the muffle walls follows the furnace temperature with only a slight temperature lag. However, the pyrometer probe in the center of the charge indicates a much greater temperature lag during the heat up period and a lengthy isothermal period of 810° C during the last portion of the heat up period and the first portion of the isothermal period. Even at the end of the 15 hour heat soak period, the center of the charge reached only 1150° C.

After the furnace is allowed to cool to room temperature, a sample is taken from the portion of the aluminum oxide product near the muffle wall and a second sample from the central portion. A surface area determination conducted on both of these samples shows that the aluminum oxide near the muffle wall is overcured (has too low a surface area per gram). When the aluminum oxide product is removed from the muffle and subsequently mixed, it has an undesirable mixture of coarse particles (overcured material) and fines (undercured).

EXAMPLE 3

Illustration of a second embodiment of the present invention:

A continuous-type of vertical kiln is provided which has a high alumina tube of 7 inches ID × 8 feet long comprising an open ended muffle with its central axis vertical. This tube is provided with conventional means for externally heating its central 6 feet long portion to any controlled temperature up to 1250° C. In addition, the tube is provided with suitable conventional means for introducing powder into its upper portion at a controlled blow rate and conventional means for withdrawing powdered product from the lower end of the tube at a controlled rate. Also, means are provided for collecting and removing gaseous by-products from each end of the tube.

At the start of a run, the lower three feet of the muffle tube was filled with uncured and uncrushed aluminum oxide produced in a prior conducted run. The upper five feet of the tube was filled with crushed, powdered dehydrated aluminum sulphate. Then the muffle tube was heated to approximately 1100° C in a heat up time of about 8 hours and then maintained at that temperature throughout the remainder of a 1 week run. A steady supply of dehydrated aluminum sulphate was introduced into the upper end of the tube during the entire run. At the conclusion of the heat up period, the flow control apparatus at the lower exit of the tube was adjusted to remove product at the rate of approximately 1 foot per hour of downward rate. Thus, the material in the tube moved downward at about 1 foot per hour. The bulk density of the uncured aluminum oxide product of the calciner was about 0.3 gms/cm$^3$ and was quite lumpy. During the last portion of the heat up period and all of the remainder of the run, the evolution of gaseous by-products continued from the decomposition zone in the interior of the tube. The rentention time of the aluminum sulphate in the heated portion of the tube was sufficient to allow substantially all of it to decompose into uncured aluminum oxide.

A roll crusher is provided to grind the uncured product removed from the muffle tube to minus 40 mesh. In addition, a mechanical sifter was provided to screen the crushed aluminum oxide through a 40 mesh screen and return the oversized material to the roll crusher. The minus 40 mesh product of the sifter had a bulk density of approximately 0.8 gms/cm$^3$ and served as feed material to the curing kiln to which it is then fed.

The curing kiln was identical to the thermal decomposition kiln already described in this example.

At the start of the curing operation the lower three feet of the curing kiln is also filled with cured material from a previous run. Then, the upper 5 feet is filled with the minus 40 mesh uncured material already produced in this example. Next, the tube was heated during an 8 hour heat up period to 1200° C. As soon as this 1200° C temperature has been maintained for 2 hours, the flow control apparatus at the bottom of the tube was turned on to a speed to remove powder from the kiln at a rate of approximately 6 inches per hour. Thereafter, the curing kiln was allowed to operate under steady state conditions for as long as desired. A steady supply of uncured aluminum oxide was introduced into the upper end of the tube. The degree of curing, was governed by the temperature of the muffle tube, the rate at which the aluminum oxide powder moves through the tube (retention time) and the bulk density of the feed material to the curing kiln. The conditions illustrated in this example produced a cured aluminum oxide having a uniform particle size and a surface area per gram suitable for the production of high quality super dense alumina bodies.

Although the invention has been described with reference to certain specific examples, and although various modifications, changes, ranges, etc., it will be apparent to those skilled in the art that other modifications may be made thereto which fall within its scope.

What is claimed is:

1. A method of producing aluminum oxide powder of substantially uniform particle size from aluminum sulfate comprising
    1. first thermally treating said aluminum sulfate at a temperature in the range from about 800° to about 1150° C.
    2. maintaining said temperature for a time sufficient to decompose all of said aluminum sulfate and to form a mass of aluminum oxide having a uniform temperature throughout, and
    3. thereafter subjecting said uniformly heated mass of aluminum oxide to additional heat to raise its temperature uniformly at approximately the same rate as the heat source to a curing temperature in the range from about 1175° to about 1250° C. for an additional period of time sufficient to cure said aluminum oxide and to increase the average particle size of aluminum oxide.

2. A method as defined in claim 1 wherein said aluminum sulfate comprises aluminum sulfate in admixture with ammonium aluminum sulfate.

3. A method as defined in claim 1 wherein subsequent to step (3) said aluminum oxide is cooled to below about 1150° C.

4. A method as defined in claim 1 carried out in a batch-type muffle furnace.

5. A method as defined in claim 1 carried out in a continuous calciner.

6. A method as defined in claim 5 further comprising carrying out said steps (1), (2) and (3) in one vessel having two differing temperature zones.

7. A method as defined in claim 1 carried out in a rotary-type calciner.

8. A method as defined in claim 1 wherein aluminum sulfate is introduced at one end of a furnace and cured aluminum oxide is withdrawn at another end thereof.

* * * * *